United States Patent [19]

Young

[11] Patent Number: 5,797,818
[45] Date of Patent: Aug. 25, 1998

[54] CHAIN TENSIONER WITH DAMPING FEATURE

[75] Inventor: James D. Young, Chesaning, Mich.

[73] Assignee: Cloyes Gear and Products, Inc., Mentor, Ohio

[21] Appl. No.: 806,844

[22] Filed: Feb. 26, 1997

Related U.S. Application Data

[60] Provisional application No. 60/014,502 Apr. 2, 1996.
[51] Int. Cl.$^6$ .................................................. F16H 7/08
[52] U.S. Cl. .......................................... 474/111; 474/135
[58] Field of Search ........................... 474/94, 101, 111, 474/135

[56] References Cited

U.S. PATENT DOCUMENTS 3,490,302  1/1970  Turner et al. .
4,921,472  5/1990  Young .
5,055,088  10/1991  Cradduck et al. ............... 474/111
5,266,066  11/1993  White .
5,286,234  2/1994  Young .
5,462,493  10/1995  Simpson .

Primary Examiner—Roger J. Schoeppel
Attorney, Agent, or Firm—Fay, Sharpe, Beall, Fagan, Minnich & McKee

[57] ABSTRACT

A tensioner capable of controlling strand vibration and motion and reducing noise in a slack strand of a chain assembly includes a flexible shoe, an elongated spring and a resilient damping device. The flexible shoe is pivotally mounted on a tensioner bracket to engage and tension a chain. The elongated spring is inserted in the flexible shoe to apply a tensioning force to the shoe. The resilient damping device is mounted between the tensioner bracket and the spring to limit chain vibration occurring due to valve events and firing pulses of an engine. The damping device is particularly useful in damping vibration in an automotive engine timing drive.

23 Claims, 7 Drawing Sheets

5,797,818

1

CHAIN TENSIONER WITH DAMPING FEATURE

This application claims the benefit of U.S. Provisional Application Ser. No. 60/014,502 filed Apr. 2, 1996.

BACKGROUND OF THE INVENTION

The present invention relates to an improved chain tensioning device and more particularly to a chain tensioning device with a damping mechanism for tensioning a chain in an automotive engine timing drive.

Chain tensioners are used to control the tension in a power transmission chain, belt, or any similar power transmission device. It is generally important to provide a certain degree of tension in the chain or belt to control vibration of the chain. Control of vibration also decreases system noise. In addition, wear to chain components during extended use can cause chain elongation which results in decreased chain tensioning.

Chain tensioners are used in numerous applications including with timing chain assemblies on internal combustion engines. In the harsh environments of internal combustion engines belt or chain tension can vary greatly due to wide variations in temperature and difference of coefficients of linear expansion between different parts of the engine. Thus, chain tensioners are used to achieve a uniform chain tension.

A typical timing chain assembly for an internal combustion engine is shown in FIG. 1 and generally includes a chain 100 connected and operable between a pair of spaced sprockets 102, 104 mounted on shafts in an engine head and/or an engine case or block. As the chain 100 passes around the sprockets 102, 104, the chain typically includes a taut strand 106 and a slack strand 108 between the sprockets. The chain tensioner 110 rides against the slack strand 108 of the chain between the two sprockets. In addition, the chain assembly may include a chain guide 112 positioned against the taut strand 106 of the chain.

The chain tensioner 110 generally includes an elongated flexible blade 114 which is pivotally mounted on a pivot pin 120 at one end and pivots to apply a tensioning force to the chain 100. A second end of the blade 114 is received against a flange or ramp 118 of a chain tensioner bracket 126. A spring 116 is inserted in a pair of slots in the blade 114 and maintains the blade in contact with the chain 100. As the chain 100 deflects the free end of the blade translates longitudinally along the ramp 118 while the blade rotates around the pivot pin 120 at the opposite end. Examples of chain tensioners of this type are described in U.S. Pat. Nos. 3,490,302; 4,921,472; 5,266,066; 5,286,234; and 5,462,493.

Various examples of chain assemblies in which chain tensioners are used include primary drives where a chain is wrapped around a cam drive shaft and a crank driven shaft, as well as secondary drives in a compound drive arrangement where a chain is looped around a cam drive sprocket and an intermediate drive sprocket for use with peripheral engine features. Examples of peripheral engine features would include an oil pump, a power steering pump, and an air conditioning compressor. Where a peripheral engine feature is driven a second chain wraps around the intermediate drive sprocket and a crank driven sprocket to define the primary drive. Other examples of chain assemblies employing chain tensioners include unitary drives that include a chain wrapped around three or more sprockets including sprockets attached to a crankshaft, one or more camshafts, as well as the peripheral engine features described above.

2

Mechanical blade-type tensioners are simple devices that function very well in many of the shorter center distance cam-in-block engines for tensioning the slack strand of the timing drive. These tensioners control the chain strand so as not to allow excessive transverse chain motion or vibration throughout the operating speed range. The magnitude of the tensioning force applied to the chain by the tensioner blade should not be greater than the amount of force required to limit movement and excessive vibration. As the chain wears and elongates in service, the tensioner must have sufficient take-up capability to continue to properly control the movement of the chain strand at the new elongated chain lengths.

In addition to slack in the chain caused by chain elongation, the chain moves or vibrates in response to valve events and firing pulses or torsionals. Therefore, the tensioner blade and spring react in response to the valve events and firing pulses or torsionals, causing the blade to stroke dynamically.

A summation of the forces acting on a typical blade and spring tensioning assembly is shown in FIG. 2. The chain force $F_c$, shown at the midpoint of the blade 114, is the force applied by the chain 100 to hold the blade and spring at a given position or deflected height. The actual chain loading or force $F_c$ acts over the total contact length between the chain 100 and the blade 114. FIG. 2 also shows a generally acceptable level of slack strand dynamic motion a of approximately 2.5 mm total blade and spring travel at 5000 rpm. The forces $R_1$ and $R_2$ oppose the force $F_c$ and are applied at opposite ends of the blade 114 by the ramp 118 and the pivot pin 120.

In general, the tensioner spring 116 has three key height positions as shown in FIG. 3, namely maximum deflection b, maximum system wear c (which is also minimum deflection), and free height d. The maximum deflection height b is the maximum the spring 116 will allow the tensioner to deflect without yielding by application of the force $F_c$. The maximum system wear height c or minimum deflection is the preferred minimum amount of deflection for which the spring 116 is used. However, the spring 116 will exert a force $F_c$ on the chain for any amount of movement up to the free height d of the spring, the effective working range e is designed to be well within a total spring travel capability f, between the maximum and minimum deflection heights b and c. The small effective working range e allows for part tolerances and build stack-up conditions. The effective working range e between the maximum and minimum deflection for known chain tensioners is approximately 3 mm, while the spring travel capability f is approximately 12 mm.

FIG. 4 is a graph of tensioner blade movement versus engine speed for a typical cam-in-block V-6 engine. The nominal or installed blade position (blade motion=0) is shown in addition to the peak-to-peak blade amplitude of blade vibrations. The dynamic blade movement between the maximum and minimum excursions from the nominal position is much less than the 3 mm effective working range e at all speeds up to at least 6,000 rpm. This is well within the acceptable deflection limits.

In contrast, FIG. 5 shows the same engine with a worn chain such that the nominal position of the blade is shifted by approximately 3 mm. The dynamic maximum and minimum excursions from the nominal position are very nearly identical to those in FIG. 4, but the blade and spring are "working" at a new nominal position in order to tension the longer chain.

In operation, as the tensioner of FIG. 1 reacts to the torsional vibration inputs in the firing engine, the free end of the blade 114 will translate up and down the ramp 118 and the blade will rotate about the pivot pin 120 at its opposite or pivot end in accordance with the vibrations. The spring 116 will continuously force the blade 114 to a new arcuate shape to maintain contact with the chain 100. For some chain drive applications using a blade-type tensioning device, this type of tensioner will control strand vibration and noise sufficiently. However, many engines produce excessive camshaft and crankshaft torsional vibration and noise that is not controllable by standard tensioning devices.

SUMMARY OF THE INVENTION

The device according to the present invention addresses the disadvantages of the prior art tensioning devices by supplying a tensioner capable of controlling substantially all vibration and noise in a slack strand of a chain assembly such as an automotive engine timing drive. This object is met by the addition of a resilient damping device to the chain tensioner. The chain tensioner with the damping device dampens chain motion due to the excessive camshaft and crankshaft torsional vibration and reduces noise that is not controllable by a standard tensioning device without a damper.

Other objects of the invention include providing a simple, cost effective, variable rate damping device which will dampen chain vibration throughout the working travel of the tensioning device, as well as control of noise, vibration, and harshness. The invention also extends the overall system life of the chain tensioner.

According to one aspect of the present invention, a chain tensioning apparatus for tensioning a chain in a timing chain assembly having a pair of sprockets operatively connected by a chain, the chain tensioning apparatus includes a tensioner bracket, an elongated shoe having first and second ends joined by an elongated central body section, and the first end of the shoe pivotally mounted on the tensioner bracket. An elongated spring having first and second ends is supported in the first and second ends of the shoe, and a central section of the spring applies a tensioning force on the central body section of the shoe. A resilient damping device is mounted on the tensioner bracket and engages the spring to limit chain vibration.

According to a further aspect of the present invention, a tensioning device with a damper includes a tensioner bracket and an elongated tensioning member supported on the tensioner bracket. The tensioning member has a blade for engaging a power transmission member and a spring for biasing the tensioning member against the power transmission member. A resilient damping body engages the tensioning member for damping vibration in the tensioning member caused by vibration of the power transmission member.

A principal advantage of the invention is the ability to damp excessive vibration and noise in a chain which is not controllable with known chain tensioning devices.

Still other advantages and benefits of the invention will become apparent to those skilled in the art upon a reading and understanding of the following detailed description.

BRIEF DESCRIPTION OF THE DRAWING FIGURES

The invention may take physical form in certain parts and arrangements of parts, a preferred embodiment of which will be described in detail in this specification and illustrated in the accompanying drawings which form a part hereof, wherein.

DETAILED DESCRIPTION OF THE PREFERRED EMBODIMENT

Figure 1:
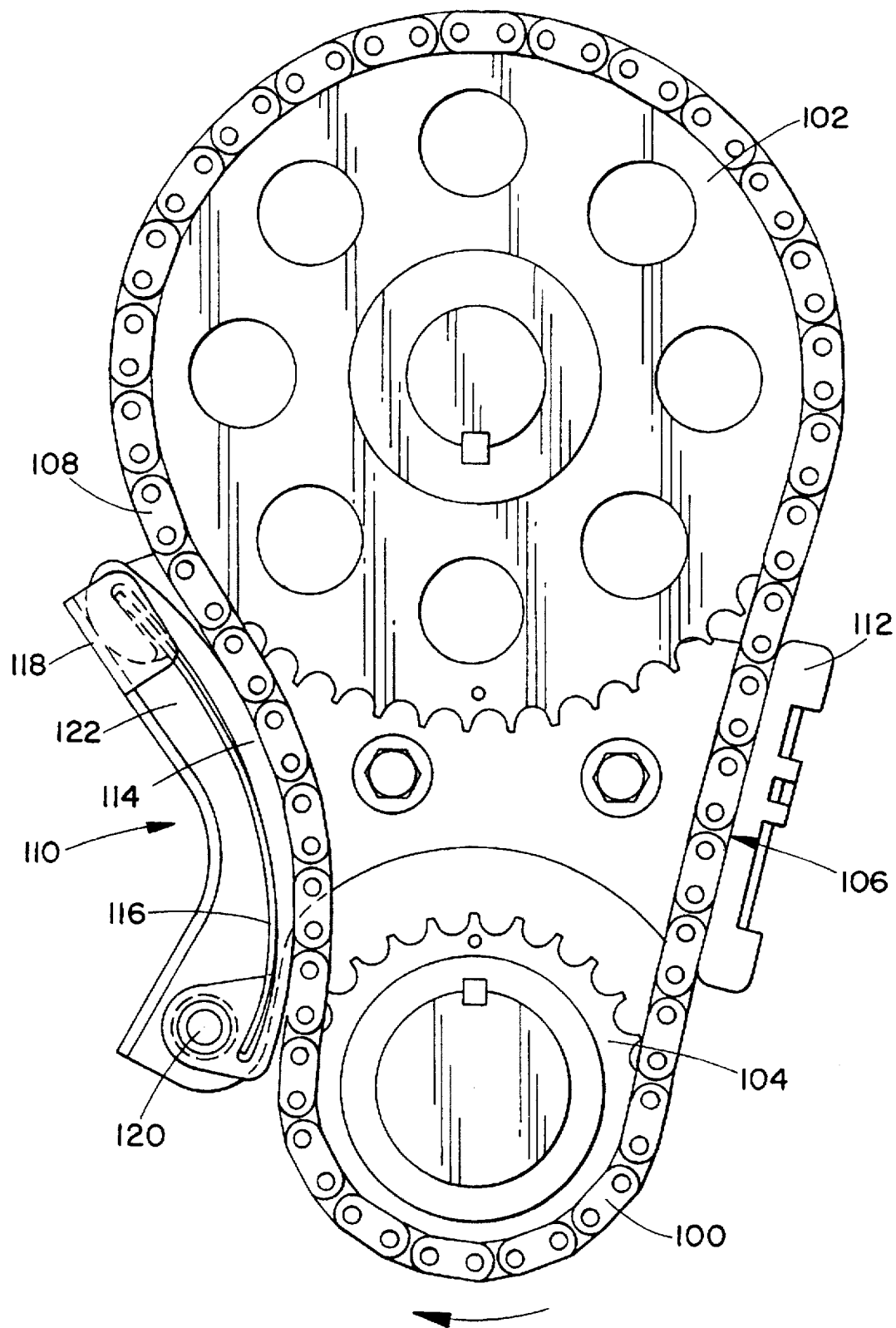
FIG. 1 is a front view of a prior art chain drive mechanism including a chain tensioner.
Figure 2:
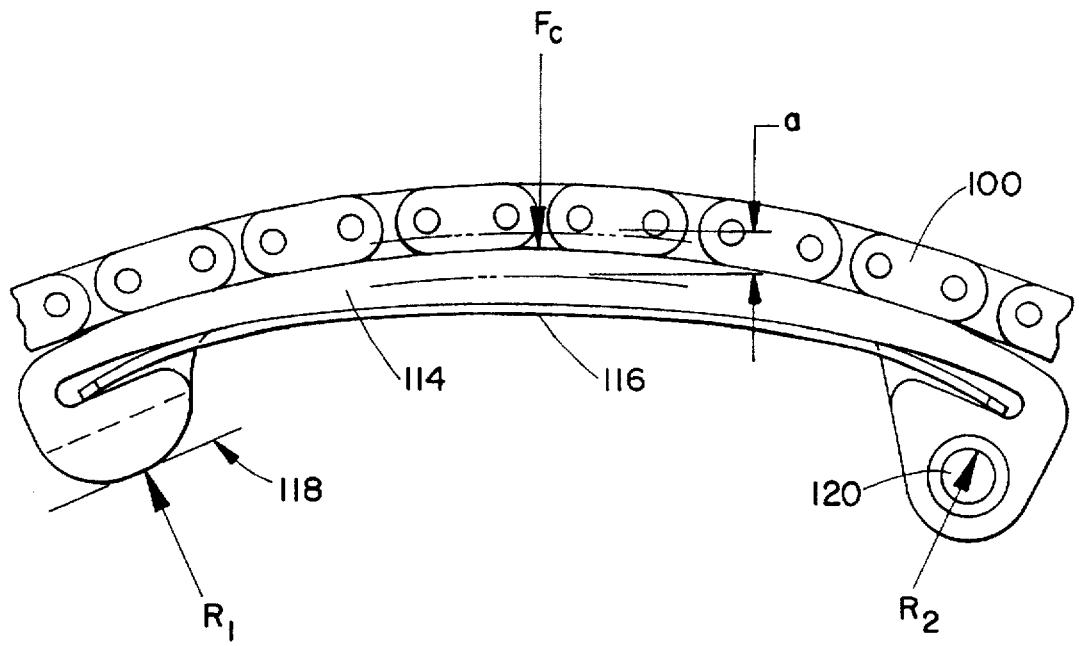
FIG. 2 is an enlarged front view of a prior art chain tensioner illustrating the forces applied to the chain tensioner.

Referring now to the drawings wherein the showings are for the purposes of illustrating the preferred embodiment of the invention only and not for purposes of limiting same, the FIGURES show a chain tensioner 20 having a damping device 50 for controlling chain vibration and noise.

Figure 6:
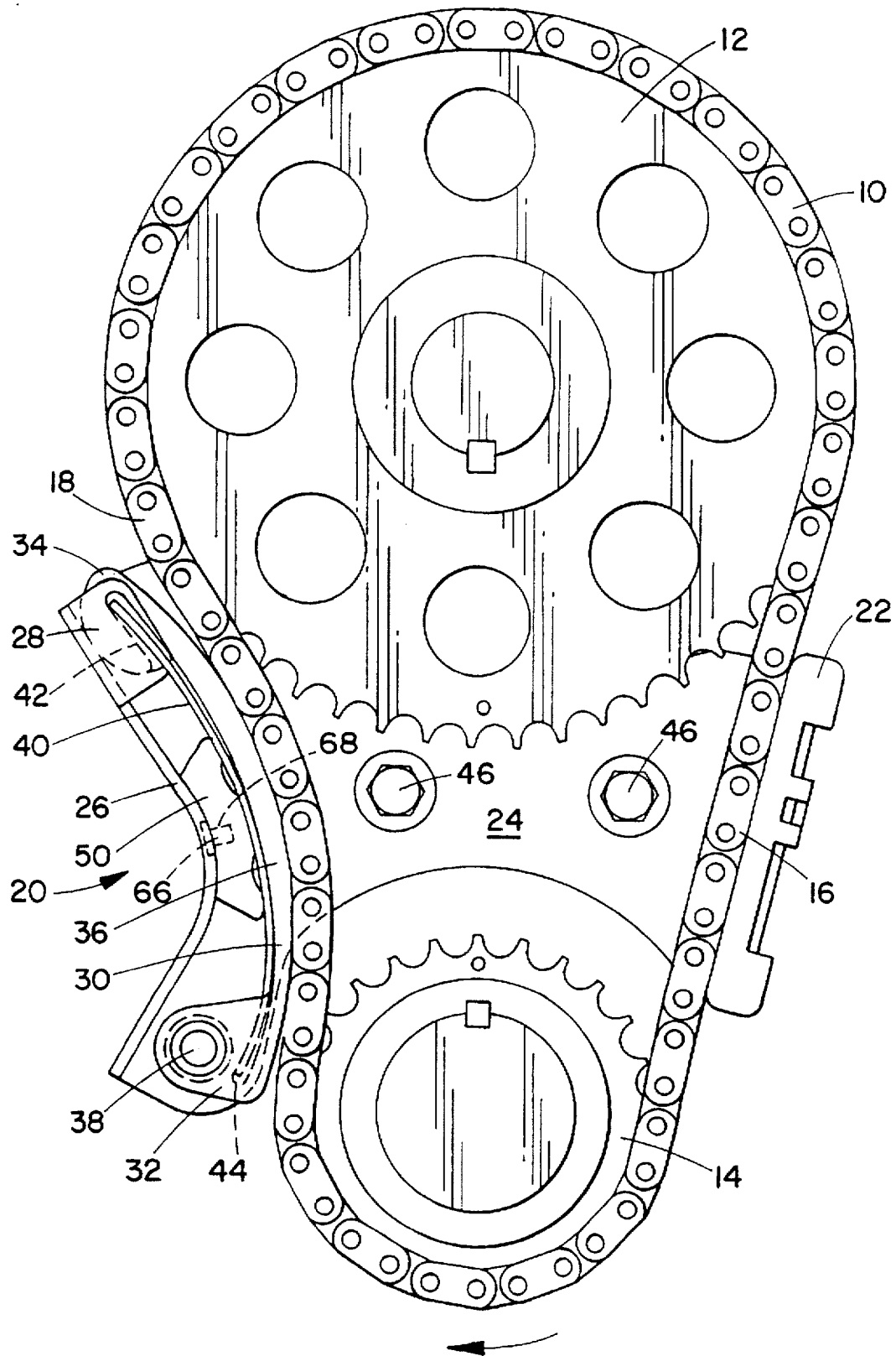
FIG. 6 is a front view of a chain drive mechanism including a chain tensioner with a damping device according to the present invention.

FIG. 6 shows a timing chain assembly including a chain 10 operable between a large driven sprocket 12 and smaller drive sprocket 14 in a cam-in-block drive. The large sprocket 12 is a driven sprocket in an engine head for driving a camshaft and the smaller drive sprocket 14 is a crank sprocket in the engine case or block which drives a crankshaft.

As illustrated in FIG. 6, the chain 10 has a taut strand 16 and a slack strand 18 extending between the sprockets. The chain tensioner 20 is located along and provides tension to the slack strand 18, while a guide 22 is located along the taut strand 16. The chain tensioner 20 and the guide 22 are mounted on a bracket or base plate 24 which is attached by two bolts 46 to the engine structure and extends along a back side of the sprockets. The chain tensioner 20 and the taut strand guide 22 are shown to be mounted on a single base plate 24, however, they may also be mounted on separate plates or brackets.

The chain tensioner 20 includes a chain tensioner shoe 30, a leaf or blade spring 40 inserted in the shoe, and a damping device 50. The chain tensioner shoe 30 is formed of a flexible material and has a first end 32, a second end 34, and a flexible intermediate section or blade 36 for abutting and providing tension to the chain 10. The first end 32 of the shoe is pivotally connected to the base plate 24 by a pivot pin 38. The base plate 24 includes a flange 26 which projects substantially perpendicularly from the base plate along one curved end surface of the plate. The flange 26 acts as a ramp for the second end 34 of the chain tensioner 20 and also acts as a support for the damping device 50. The flange 26 has a tab 28 at one end thereof which extends substantially perpendicular to the flange over one end of the chain tensioner 20.

The second end 34 of the shoe is received between the chain 10 and the flange 26 of the base plate 24. As the shoe flexes, the second end 34 of the shoe moves longitudinally along the flange 26 which acts as a ramp. The tab 28 formed on the flange 26 prevents the shoe 30 from slipping out from between the flange and the chain 10. The shoe may be formed of any durable, flexible material such as a resinous plastic material.

The spring 40 is more arcuate in shape than the shoe 30. The chain tensioner 20 receives the spring 40 which fits into the shoe 30 by slipping the ends of the spring into lateral inward extending slots 42, 44 formed in the first and second ends 32, 34 of the shoe. The spring 40 is nearly as long as the shoe and continuously biases the intermediate section or blade 36 of the shoe against the chain 10. The spring 40 is positioned substantially parallel to the surface of the blade which engages the chain and may be nearly as wide as the full width of the shoe.

The damping device 50 is inserted in the chain tensioner 20 between the flange 26 of the base plate and the spring 40 to damp chain vibration and limit chain motion to a desired level. The damping device 50 is a block of material of a predetermined shape preferably formed of a resilient rubber or synthetic compound, such as nitrile or Vamac. The damping device may be formed by extrusion or by any other known method.

The damping device 50 is secured on the bracket flange 28 by a stepped pin 66 which is fitted in a recess in the flange or otherwise formed on the flange. An end of the pin 66 which extends toward the spring 40 is received in a counter bore 68 in the damping device. In addition to the counter bore 68 and pin 66 arrangement, an adhesive bonding material may be used to bond the damping device 50 to the flange 28. Alternatively, the damping device 50 may be either adhesively bonded or molded in place on the bracket flange 26 without the additional securing provided by the pin 66.

Figure 7:
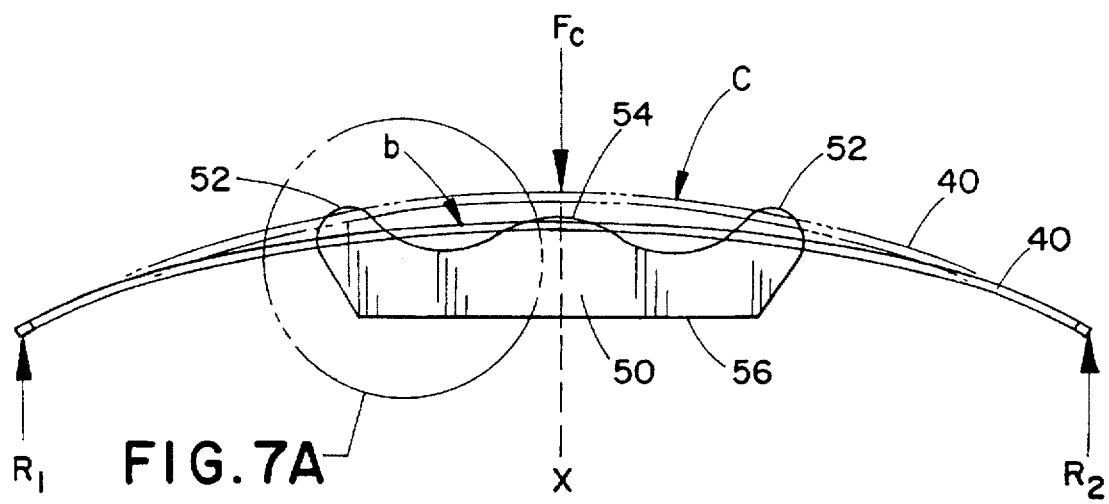
FIG. 7 is a front view of the spring and damping device of FIG. 6.

FIG. 7 illustrates the damping device in its uncompressed form. The damping device 50 is generally symmetrical about a central axis X thereof and includes a front side having two arcuate or hyperbolic shaped protruding end portions 52 and an arcuate or hyperbolic central portion 54. A back side 56 of the damping device 50 is substantially planar or otherwise shaped to conform to the surface of the flange 26 on which it is supported or mounted.

The damping device 50 preferably has a constant thickness which is as great as a width of the shoe 30. However, the thickness and the profile of the damping device 50 may be varied in order to tailor the damping function. The damping device has a thickness along the Z axis of between 12 mm and 20 mm. The length of the damping device, 50 along the Y axis is between 30 mm and 40 mm, preferably about 35 mm. The damping device 50 is preferably located at the center of the length of the spring.

Although the damping device 50 is illustrated as symmetrical about the central axis X, the particular shape of the damping device may be asymmetrical depending on the physical configuration of the tensioner bracket. In both symmetrical and asymmetrical damping devices 50 the shapes of the end portions or lobes of the damping device are preferably designed to provide symmetry of compression.

Figure 3:
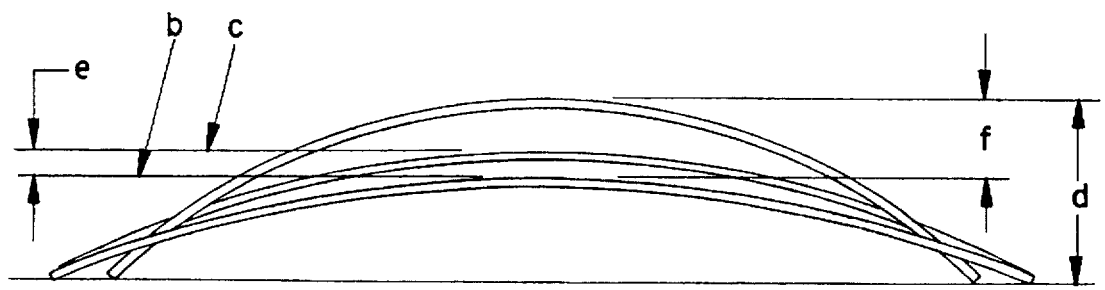
FIG. 3 is an enlarged front view of the spring for use in a chain tensioner illustrating the different spring positions.
Figure 4:
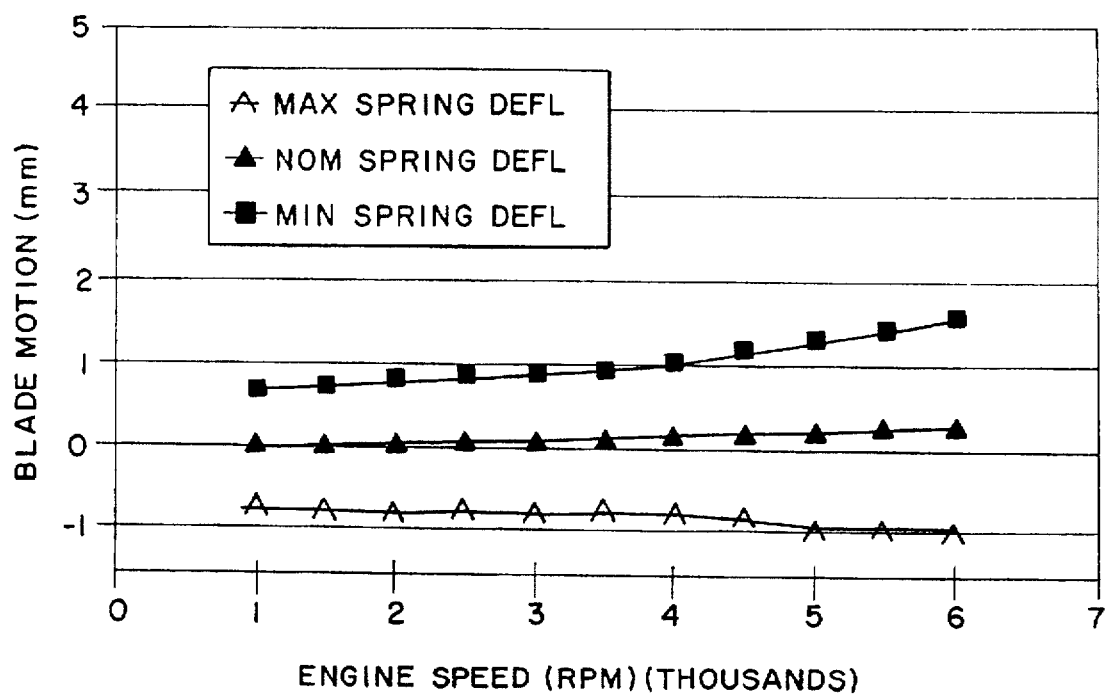
FIG. 4 is a graph of blade motion versus engine speed for a new system with a prior art tensioner.
Figure 5:
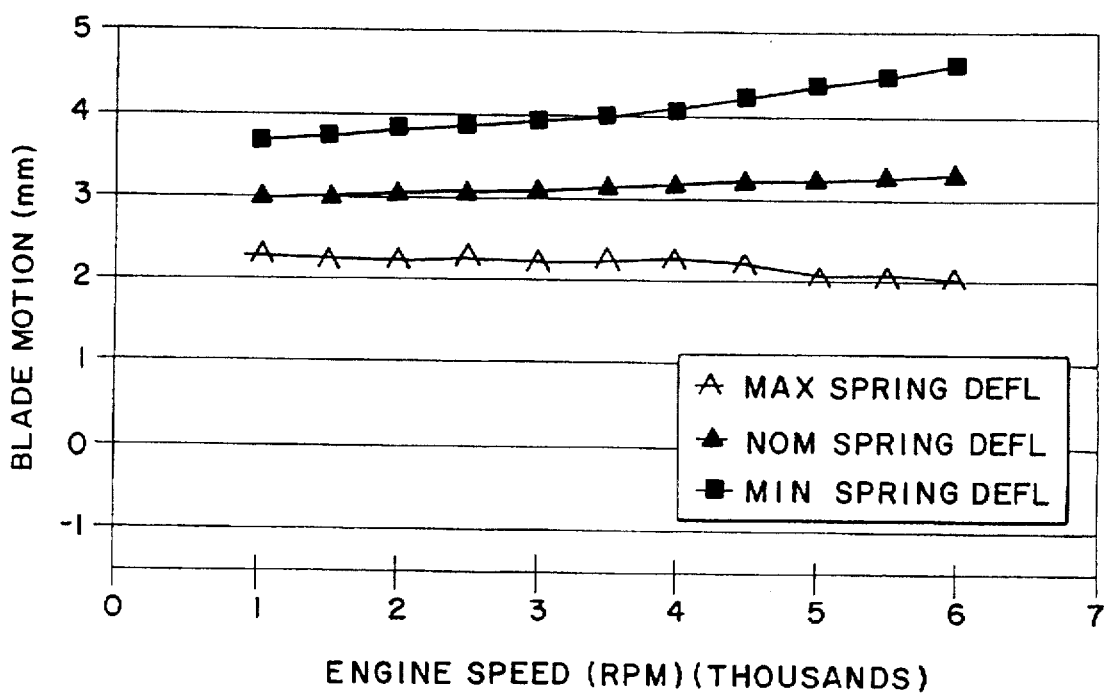
FIG. 5 is a graph of blade motion versus engine speed for a high mileage system with a prior art tensioner.

FIG. 7 shows the damping device 50 in its free, uncompressed form relative to two spring positions. The two spring positions b, c reflect the nominal spring deflections for a new, as installed chain and a worn chain at high mileage and are discussed above with respect to FIG. 3. These "nominal" spring positions are "static" in the sense that they represent a blade and spring movement based on chain length and drive geometry for a given amount of system (primarily chain) wear. Dynamic motion will increase the spring travel in each direction from these nominal positions.

In operation, the end portions 52 of the damping device 50 will flex outward away from the central axis X as a force is applied to the spring 40 and the blade 36 by the chain 10. As shown in FIG. 7, the central portion 54 of the damping device does not contact the spring 40 until the spring begins to be deflected.

The damping device 50 must provide a desired amount of damping for a given position of the spring 40. Effective damping throughout the working travel can be achieved by "tailoring" the profile of the damping device 50 with respect to the arcuate form of the spring 40 at the working position limits. The amount of compression of the material of the damping device 50, therefore, can be controlled by its profile. For the damper profile shown in FIG. 7, the midpoint of the damper does not contact the spring 40 until the spring approaches its maximum deflection height b. The contact interface between the damping device 50 and the spring 40 is symmetrical about the center axis X of the damping device.

Figure 7A:
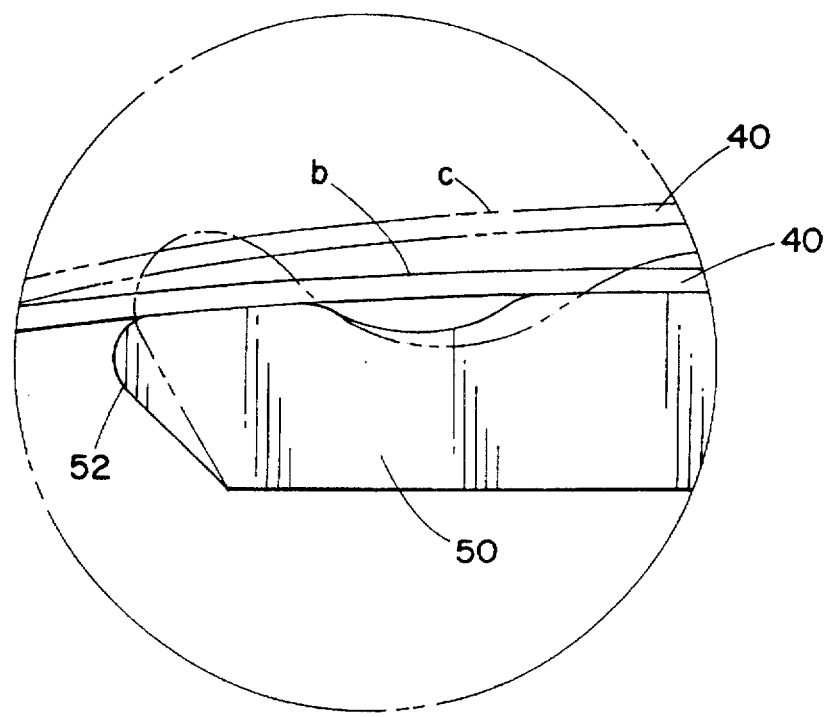
FIG. 7A is an enlarged view of a portion of the spring and damping device of FIG. 7.

FIG. 7A shows how the profile at each end of the damping device 50 can effectively contribute to the damping at maximum spring deflection without exceeding the compression stress limits of the damping device material by permitting the end portions 52 to deflect outward as well as compress. The damper profile can be tailored by changing the size and shape of the end portions 52 and central portion 54 to provide a desired dynamic damping. The amount of damping can also be tailored by the selection of a material. The material for use in the damper device 50 preferably has a hardness between about 55 Shore A and about 95 Shore A, more preferably about 75 Shore A.

Figure 8:
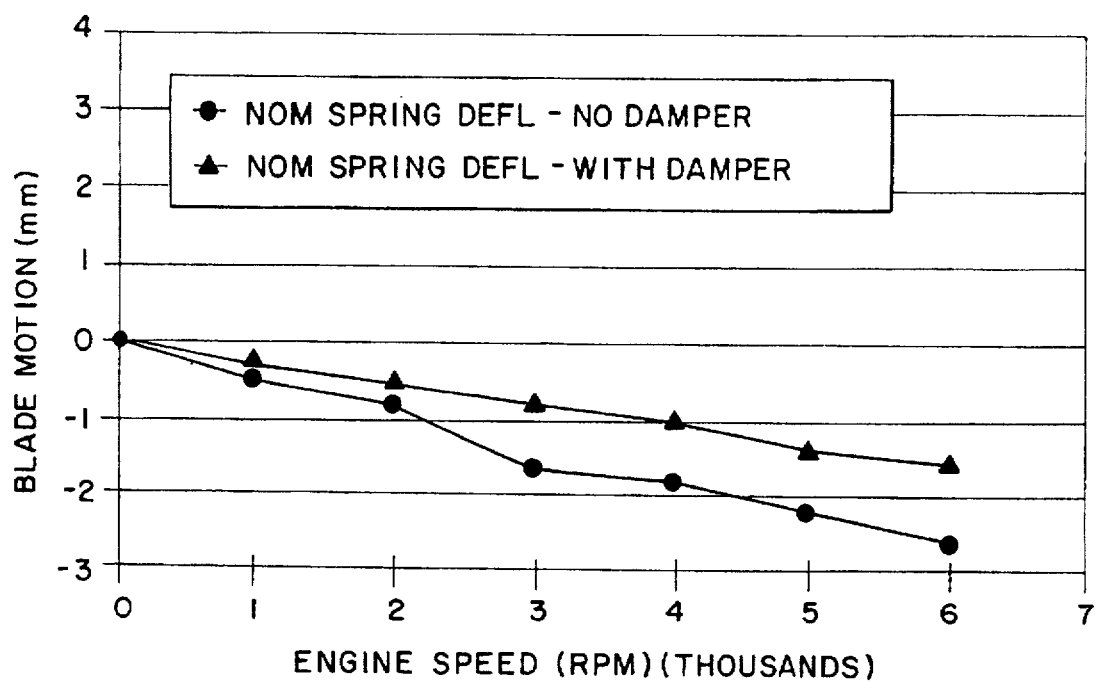
FIG. 8 is a graph of blade motion versus engine speed for a new system with and without a damper.

FIG. 8 illustrates the blade motion of a new system with and without a damping device 50. The maximum displacement for a system with a damping device 50 is shown to be substantially less than without the damping device. As shown in the FIGURE, this damping becomes particularly effective above 2000 rpm when chain vibration tends to become more excessive.

Figure 9:
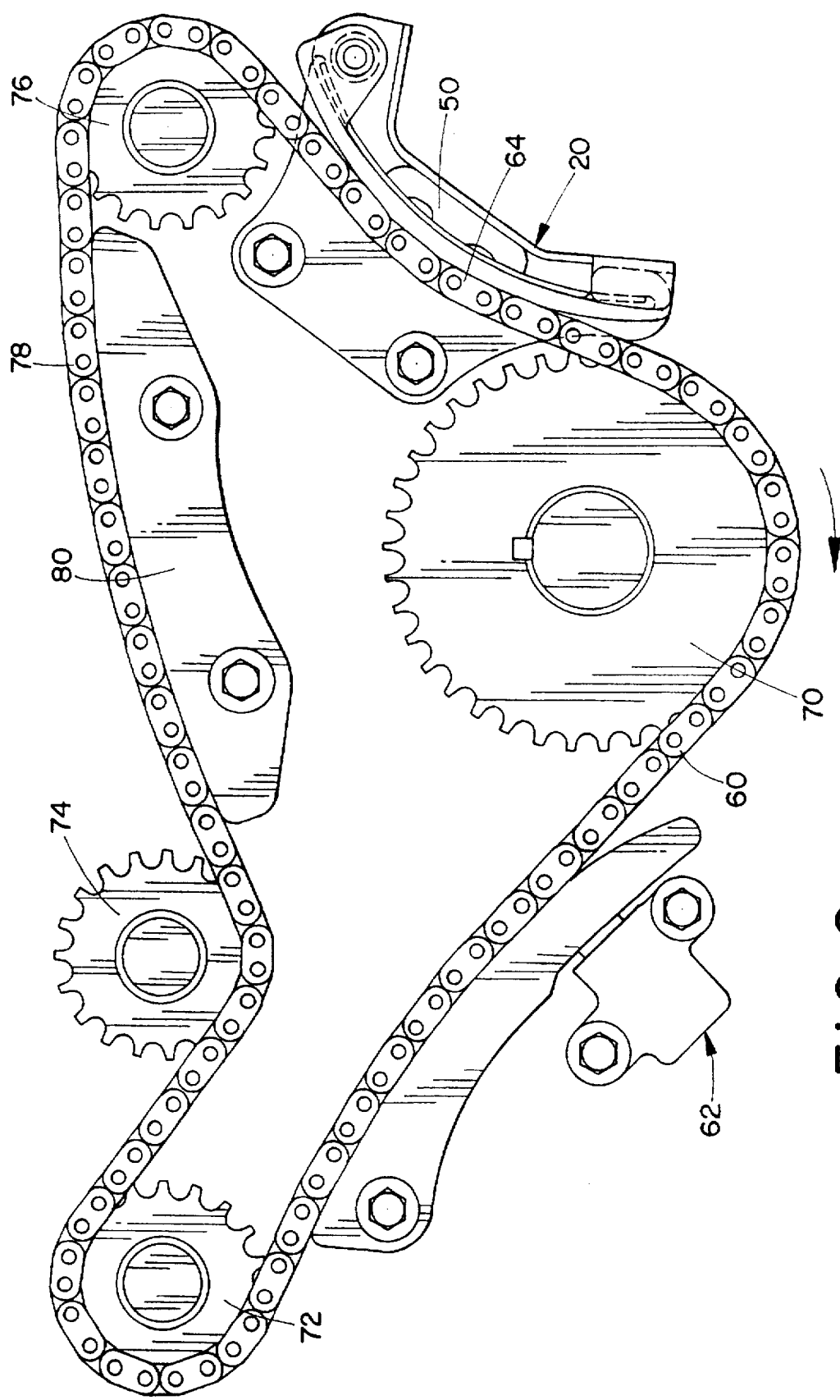
FIG. 9 is a front view of a four sprocket balance shaft chain drive system with a tensioner according to the present invention.

FIG. 9 shows a four sprocket balance shaft chain drive system including four sprockets 70, 72, 74, 76 in which a slack strand 60 is tensioned using a hydraulic tensioning device 62. In addition, one taut strand 78 is provided with a taut strand guide 80. It has been found that a blade-type mechanical tensioner 20 with a damping device 50 according to the present invention can be advantageously used to control vibration in the taut strand 64 of this system as well as contributing to enhanced slack strand control for many applications. It should be noted that a taut strand tensioner does not have to accommodate chain wear elongation. In fact, the only blade movement of the taut strand 64 will be vibration as a result of chain strand dynamics and engine speed.

Figure 10:
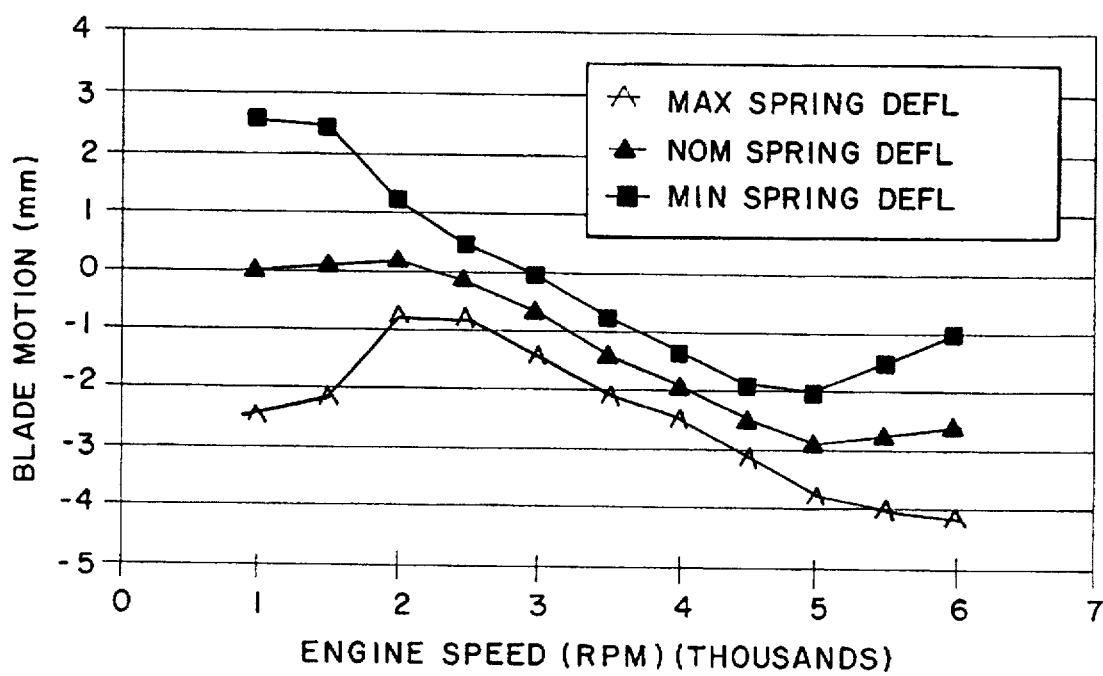
FIG. 10 is a graph of the blade motion versus engine speed for the system of FIG. 9 having a chain tensioner without a damping device.

The FIG. 10 graph depicts dynamic blade motion for a four strand tensioner as illustrated in FIG. 9 without the damping device 50. As shown, the taut chain strand 64 further deflects the blade and spring with increasing engine speed. It is also shown that resonance or vibration of the taut chain strand 64 is a problem at both low, engine speeds below approximately 2000 rpm, and high engine speeds above approximately 5000 rpm, for the chain drive represented by the FIG. 10 graph. The addition of the damping device 50 to the taut strand tensioner 20 will greatly reduce this dynamic motion.

The selection of a material having a particular hardness for the damping device 50 would be determined by the required working travel (compression) and chain drive dynamics.

A chain tensioner with the damping feature as described above has numerous advantages over the prior art including control of excessive chain strand vibration without appreciably adding to the tensioning load. In addition, the damping device 50 is simple and does not add undue complexity to the tensioner assembly.

Desired damping rate and spring position will determine the specific profile or shape of the damping device 50. Damping device shape and contact position along the length of the spring 40 will effectively provide a variable damping rate. The damping device 50 can be designed so that the damping rate approaches a constant value if that provides improved chain strand control.

The damping device 50 will come into contact with the spring (along its length) at different times. The outer-edges 52 of the damping device 50 where spring movement is the least should be the first areas to contact the spring. The desired damping rate for a given spring deflection will define the longitudinal position of the damper/spring interface as well as the damper compression at the point(s) of contact. The damper shape at its ends allows for deflection as well as compression so as not to over-stress the material at max spring deflection.

Typically, it is an advantage to have the spring contact the damper midpoint later in its travel or closer to max spring deflection. However, if earlier contact is beneficial to achieve a desired damping rate, the profile of the damping device 50 would necessarily change. When used as a taut strand tensioning device, the desired damping rate will be easier to achieve since the damping feature does not have to accommodate a blade path change due to chain wear or elongation.

The present invention has been described as a tensioning device for tensioning a chain. However, it should be understood that the tensioning device is equally applicable to tensioning of other power transmission members such as belts and the like.

While the invention has been described in detail with reference to a preferred embodiment thereof, it will be apparent to one skilled in the art that various changes can be made, and equivalents employed without departing from the spirit and scope of the invention.

Having thus described the invention, it is claimed:

1. A chain tensioning apparatus for tensioning a chain in a timing chain assembly having a pair of sprockets operatively connected by a chain, the chain tensioning apparatus comprising:
   a tensioner bracket;
   a flexible shoe having first and second ends joined by an elongated central body section, the first end of the shoe pivotally mounted on the tensioner bracket;
   an elongated spring having first and second ends supported in the first and second ends of the shoe, and a central section of the spring applying a tensioning force on the central body section of the shoe; and
   a resilient damping device mounted on the tensioner bracket and engaging the spring on a side opposite the shoe to limit chain vibration, the damping device being formed from a compressible material which compresses in response to a deflection of the spring.

2. The chain tensioning apparatus of claim 1, wherein the resilient damping device includes two arcuate end portions and an arcuate central portion for engaging the spring.

3. The chain tensioning apparatus of claim 2, wherein the arcuate end portions flex outward away from each other as the spring deflects.

4. The chain tensioning apparatus of claim 1, wherein the tensioner bracket includes a flange and wherein the resilient damping device is mounted on the flange.

5. The chain tensioning apparatus of claim 1, wherein the resilient damping device is affixed to the tensioner bracket.

6. A tensioning device with a damper comprising:
   a tensioner bracket;
   an elongated tensioning member supported on the tensioner bracket, the tensioning member having a blade for engaging a power transmission member and a spring for biasing the tensioning member against the power transmission member; and
   a resilient damping body engaging the tensioning member for damping vibration in the tensioning member caused by vibration of the power transmission member, the damping body being formed from a compressible material which compresses in response to a deflection of the spring.

7. The tensioning device of claim 6, wherein the elongated tensioning member has a first end which is pivotally mounted on the tensioner bracket.

8. The tensioning device of claim 7, further comprising a ramp provided on the tensioner bracket, wherein a second end of the tensioning member is supported on the ramp.

9. The tensioning device of claim 8, wherein the resilient damping body is in engagement with the ramp of the tensioner bracket and the spring of the tensioning member.

10. The tensioning device of claim 6, wherein the resilient damping body includes two arcuate end portions, and an arcuate central portion for engaging the tensioning member.

11. The tensioning device of claim 10, wherein the arcuate end portions flex outward away from each other as the tensioning member deflects.

12. The tensioning device of claim 6, wherein the tensioner bracket includes a flange and the resilient damping body is supported on the flange.

13. The tensioning apparatus of claim 12, wherein the resilient damping body is bonded to the tensioner bracket.

14. The tensioning apparatus of claim 12, wherein the resilient damping body is molded in place on the tensioner bracket.

15. A method of damping vibrations in a blade-type mechanical chain tensioning device, the method comprising:
   inserting a resilient damping device between a tensioner support bracket and an elongated spring of a mechanical chain tensioning device;
   urging an elongated shoe of the tensioning device into contact with a chain extending between first and second sprockets; and
   damping vibrations in the chain and shoe with the resilient damping device, the damping device being formed from a compressible material which compresses in response to a deflection of the spring.

16. The method of damping vibrations of claim 15, wherein ends of the resilient damping device flex away from each other while damping vibrations.

17. The method of damping vibrations of claim 15, wherein as the spring deflects, the spring first contacts the damping device at ends of the damping device and then contacts a central portion of the damping device.

18. The chain tensioning apparatus of claim 1, wherein the resilient damping device includes a first portion and a second portion, the first portion compressing in response to a first spring deflection and the first and second portions compressing in response to a second spring deflection greater than the first spring deflection.

19. The chain tensioning apparatus of claim 1, wherein the compressible material has a hardness in the range of about 55 Shore A to about 95 Shore A.

20. The chain tensioning apparatus of claim 1, wherein the compressible material has a hardness of about 75 Shore A.

21. The tensioning device of claim 6, wherein the resilient damping body includes a first portion and a second portion, the first portion compressing in response to a first spring deflection and the first and second portions compressing in response to a second spring deflection greater than the first spring deflection.

22. The tensioning device of claim 6, wherein the compressible material has a hardness in the range of about 55 Shore A to about 95 Shore A.

23. The tensioning device of claim 6, wherein the compressible material has a hardness of about 75 Shore A.

* * * * *